United States Patent
Battiato et al.

(10) Patent No.: US 7,440,631 B2
(45) Date of Patent: Oct. 21, 2008

(54) METHOD OF COMPRESSING DIGITAL IMAGES ACQUIRED IN CFA FORMAT

(75) Inventors: Sebastiano Battiato, Acicatena (IT); Massimo Mancuso, Monza (IT)

(73) Assignee: STMicroelectronics, S.R.L., Agrate Brianza (IT)

( * ) Notice: Subject to any disclaimer, the term of this patent is extended or adjusted under 35 U.S.C. 154(b) by 0 days.

(21) Appl. No.: 11/725,643

(22) Filed: Mar. 19, 2007

(65) Prior Publication Data

US 2007/0189625 A1 Aug. 16, 2007

Related U.S. Application Data

(62) Division of application No. 10/319,405, filed on Dec. 13, 2002, now Pat. No. 7,206,458.

(51) Int. Cl.
*G06K 9/36* (2006.01)
*G06K 9/38* (2006.01)

(52) U.S. Cl. ..................................... 382/251

(58) Field of Classification Search ...................... None
See application file for complete search history.

(56) References Cited

U.S. PATENT DOCUMENTS

| | | | |
|---|---|---|---|
| 5,172,227 A | 12/1992 | Tsai et al. | |
| 5,289,289 A | 2/1994 | Nagasaki | |
| 5,629,780 A | 5/1997 | Watson | |
| 5,724,453 A | 3/1998 | Ratnakar et al. | |
| 5,799,111 A * | 8/1998 | Guissin | 382/254 |
| 5,850,484 A | 12/1998 | Beretta et al. | |
| 6,014,467 A | 1/2000 | Asano | |
| 6,049,634 A | 4/2000 | Abe | |
| 6,067,118 A * | 5/2000 | Chen et al. | 375/240.03 |
| 6,154,493 A | 11/2000 | Acharya et al. | |
| 6,246,798 B1 * | 6/2001 | Andrew et al. | 382/240 |
| 6,259,819 B1 | 7/2001 | Andrew et al. | |
| 6,272,259 B1 * | 8/2001 | Mizoguchi | 382/251 |
| 6,352,328 B1 * | 3/2002 | Wen et al. | 347/15 |
| 6,460,003 B1 * | 10/2002 | Kump et al. | 702/85 |
| 6,597,815 B1 * | 7/2003 | Satoh et al. | 382/251 |
| 6,600,833 B1 * | 7/2003 | Tan et al. | 382/167 |
| 6,625,323 B2 | 9/2003 | Henderson et al. | |
| 6,850,650 B1 | 2/2005 | Bauschke et al. | |
| 6,898,329 B1 * | 5/2005 | Takahashi | 382/272 |
| 7,110,608 B2 * | 9/2006 | Chan et al. | 382/239 |
| 2003/0063807 A1 | 4/2003 | Bruna et al. | |

FOREIGN PATENT DOCUMENTS

EP 01 82-765 5/2002

OTHER PUBLICATIONS

"Compression of Fingerprint Images" IBM Technical Disclosure Bulletin, IBM Corp. New York, US, vol. 35, No. 3, Aug. 1, 1992, p. 356.

* cited by examiner

*Primary Examiner*—Bhavesh Mehta
*Assistant Examiner*—Yuzhen Ge
(74) *Attorney, Agent, or Firm*—Lisa K. Jorgenson; Marcus S. Simon; Graybeal Jackson Haley LLP

(57) ABSTRACT

A method of compressing digital images acquired in CFA format that utilizes optimized quantization matrices. The method, basing itself on the statistical characterization of the error introduced during the processing phase that precedes compression, appropriately modifies the coefficients of any initial quantization matrix, even of a standard type, obtaining a greater compression efficiency without introducing further quality losses.

9 Claims, 4 Drawing Sheets

METHOD OF COMPRESSING DIGITAL IMAGES ACQUIRED IN CFA FORMAT

PRIORITY CLAIM

This is a divisional of the prior application Ser. No. 10/319,405, filed Dec. 13, 2002, now U.S. Pat. No. 7,206,458 the benefit of the filing date of which is hereby claimed under 35 USC 120. Application Ser. No. 10/319,405 claims priority from European patent application No. 01830765.2, filed Dec. 14, 2001, which is incorporated herein by reference.

TECHNICAL FIELD

The present invention generally concerns the acquisition and processing of digital images and, more particularly, relates to a compression method that can be advantageously used in digital image acquisition devices.

BACKGROUND

Digital images are at present used in several applications, digital photography being a case in point.

In normal usages digital images are generally made to undergo a compression and encoding procedure. This procedure, also referred to more simply as compression, reduces the occupied memory quantity and makes it possible, for example, to increase the maximum number of images that can be simultaneously stored in the memory unit of a digital still camera. Furthermore, compression promotes shorter transmission times when the images have to be transferred to some external peripheral device or, more generally, on telecommunication networks such as—for example—the Internet.

The most common and efficient compression methods at present employed are based on the transform of the images into the two-dimensional spatial frequency domain, especially the so-called discrete cosine transform (or DCT). An example of this type is represented by the system defined by the specifications of the JPEG (Joint Photographic Expert Group) international standard for the compression/encoding of images (ISO/CCITT).

Proposing a generic and flexible compression system, this standard really defines several compression methods that can all be derived from two basic methods. One of these, the so-called JPEG baseline, employs the DCT and compression of the "lossy" type, i.e. with loss of information. The present invention concerns this method and, more generally, compression methods that use the DCT or such similar two-dimensional spatial transforms as the discrete wavelet transform (DWT).

A digital image can be represented by means of a matrix of elements, known as pixels, each of which corresponds to an elementary portion of the image and comprises one or more digital values each associated with an optical component. In a monochromatic image, for example, just a single value is associated with each pixel, and in this case it is usually said that the image consists of just a single channel or plane.

In a coloured RGB image, on the other hand, associated with each pixel there are three digital values that correspond to the three components (red, green, blue) of additive chromatic synthesis. In this case the image can be decomposed into three distinct planes or channels, each of which contains the information relating to just a single chromatic component.

A compression algorithm that employs the DCT operates separately and independently on the planes that make up the image; these planes are subdivided into sub-matrices of size 8×8 pixels, each of which is then transformed by means of the DCT.

For each sub-matrix (or sub-block) there is obtained an 8×8 matrix of which the elements, the so-called DCT coefficients, correspond to the amplitudes of orthogonal waveforms that define the representation of the sub-block in the two-dimensional DCT spatial frequency domain. In practice, therefore, each DCT coefficient, identified by indices (i,j), represents the amplitude of the DCT spatial frequency identified by the indices (i,j) associated with the coefficient. In the spatial frequency domain the compression algorithm reduces the information content by selectively attenuating or eliminating certain frequencies.

The reduction of the information quantity is obtained by dividing the DCT coefficient matrices by an 8×8 matrix of integer quantization coefficients: in practice each DCT coefficient is divided by the corresponding quantization coefficient and the result is then rounded off to the nearest integer. Due to the division and rounding-off operations and depending also on the actual values of the quantization coefficients, the "quantized" matrices obtained in this way contain a certain number of zero elements. When these matrices, which generally contain many coefficients equal to zero, are encoded—as is the case, for example, in the JPEG standard—by means of a Run Length encoding and subsequently by means of a Huffmann encoding, the memory occupation becomes reduced without any further information losses being suffered.

Quantization essentially reduces the precision of the DCT coefficients. The greater the values of the coefficients of the quantization matrix, the greater will be the information reduction quantity. Since there is no way of restoring the eliminated original information, an inappropriate quantization can appreciably deteriorate the quality of the image.

Optimization of the quantization matrices makes it possible to improve the performance of the compression algorithm by introducing some kind of compromise between final image quality and compression efficiency.

A characterization of the quality deterioration introduced into a digital image by a compression algorithm is provided by the so-called PSNR (Peak-to-Peak Signal to Noise Ratio), which is a measure in dB of the quantity of noise introduced by the algorithm at a given compression ratio. The compression ratio of an algorithm, on the other hand, is measured in terms of bit rates. The bit rate represents the number of bits that are needed to represent a pixel in the compressed and encoded image.

The JPEG standard suggests the use of quantization matrices synthesized on the basis of perceptive criteria that take due account of the sensitivity of the human eye to the DCT spatial frequencies. It has been shown that the use of these matrices gives rise to considerable artifacts when the (decoded/decompressed) images are displayed on high-resolution displays.

The prior art includes numerous attempts that were made—using different approaches—with a view to pinpointing and synthesizing optimal quantization matrices. The best results were obtained with adaptive or iterative procedures that operate on the basis of statistical, contentual and perceptive criteria. These methods obtain the optimization—albeit in some cases with a considerable computational effort—by supposing that the operation is being performed in an ideal context, i.e. without taking account of the effective degradation introduced into the digital image during the acquisition phase and the processing phases that precede compression.

For this reason, solutions that in an ideal context would constitute the best trade-off between perceptive quality of the decoded/decompressed image and compression efficiency will produce non-optimal results when applied in some real context such as a digital still camera or an image scanner.

SUMMARY

In one aspect of the present invention an efficient method is proposed for producing compressed images that will make it possible to improve the results obtainable with any one of the quantization matrices synthesized by the prior art.

According to an embodiment of the invention, an approach is proposed that, basing itself on a statistical characterization of the errors introduced during the image processing phase that precedes compression, appropriately modifies the coefficients of an arbitrary initial quantization matrix—even one of the matrices suggested by the JPEG standard, for example—and obtains a greater compression efficiency than said initial matrix without introducing any further quality losses.

BRIEF DESCRIPTION OF THE DRAWINGS

The invention will be understood more readily from the detailed description given below of a particular embodiment, the said embodiment being merely an example and should not therefore be regarded as in any way limitative, together with the accompanying drawings, of which.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figures 1A, 1B:
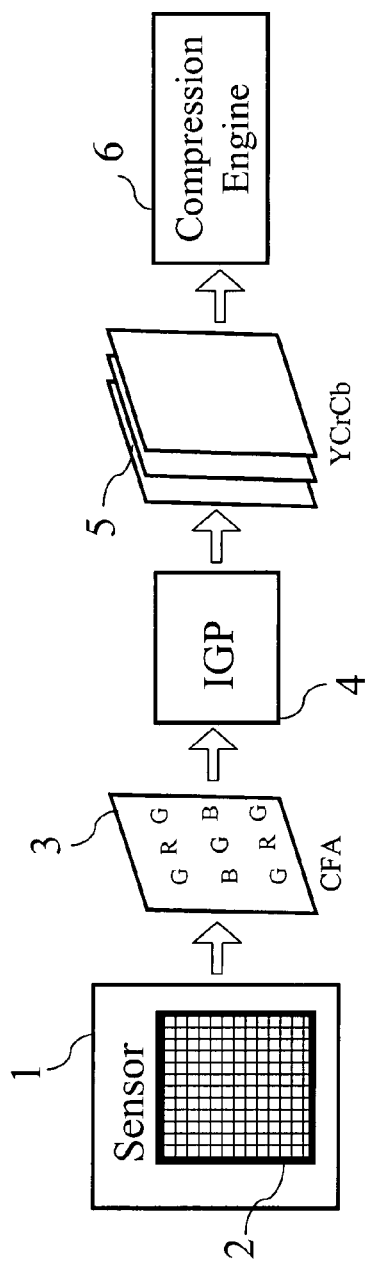
FIG. 1a shows the block logic scheme of the image acquisition and compression process in a common digital still camera.
FIG. 1b shows the arrangement of the R, G, B filtering elements in a conventional Bayer-type sensor.

Referring to FIG. 1a, a digital still camera includes an acquisition block 1 that, by means of a sensor 2, acquires an image representing a real scene.

Irrespective of whether it is of the CCD (Charge Coupled Device) or the CMOS type, the sensor 2 is an integrated circuit comprising a matrix of photosensitive cells, each of which generates a voltage proportional to the light that strikes it.

In a typical sensor each pixel is associated with just a single photosensitive cell. The sensor is covered by an optical filter consisting of a matrix of filtering elements, each of which is associated with one photosensitive cell. Each filtering element transmits to the photosensitive cell associated with it the light radiation corresponding to the wavelength of nothing but red light, nothing but green light or nothing but blue light, of which it absorbs only a minimal part, and therefore detects only one component for each pixel.

The type of filter employed varies from one producer to another, but the one most commonly used is known as a Bayer filter. The element matrix shown in FIG. 1b shows the arrangement of the filtering elements of this filter, the so-called Bayer pattern.

The voltage values acquired by the photosensitive cells in block 1 are converted into digital values by an A/D converter, which is not shown in the figure.

The image 3 representing the output of acquisition block 1 is an incomplete digital image, because it is constituted by just a single component (R, G or B) per pixel. The format of this image is conventionally known as CFA (Colour Filter Array).

The CFA image 3 is sent to block 4, the so-called IGP (Image Generation Pipeline), which has to perform a complex processing phase in order to obtain an uncompressed high-resolution digital image 5.

The core of the complex processing performed in the IGP is the reconstruction process that, using the incomplete digital CFA image as its starting point, produces a complete digital image, in RGB format for example, in which each pixel is associated with three digital values corresponding to the three components R, G, B. This transformation implies a passage from a representation of the image on just a single plane (Bayer), but containing information about the various chromatic components, to a representation on three channels (R,G,B). The reconstruction process, known as expansion to full resolution, is conventionally obtained with known interpolation algorithms or with algorithms that construct a weighted average of the information contained in the CFA image.

The expansion to full resolution, which henceforth will be referred to more simply as interpolation, though without thereby introducing any limitation at all, produces only an approximation of the image that would be obtained with a sensor capable of acquiring three optical components per pixel. In this sense, therefore, the interpolation process introduces an error that depends on the particular algorithm used in the IGP. As will be explained further on, this error, which can be likened to a noise, is a random process that can be statistically characterized in the two-dimensional spatial frequency domain.

Various other functions for improving image quality are also performed within the IGP block 4, among them exposure correction, filtering of the noise introduced by the sensor 2, application of special effects and other functions that will generally vary in both number and type from one producer to another.

Lastly, the RGB image is converted into the corresponding YCrCb image 5, in which each pixel is represented by a luminance component Y and two chrominance components Cr and Cb.

Image 5 in YCrCb format is compressed by block 6, known as Compression Engine, which could be, for example, an encoding/compression block in conformity with the JPEG baseline standard. Block 6 could also receive as input an image in some format other than YCrCb, though the choice of this particular format is to be preferred. Indeed, the JPEG compression algorithm operates separately on the three channels that make up the coloured image: a YCrCb format presents the luminance information (Y channel) already separate from the chrominance information (Cr and Cb channels). For this reason it is possible to discard a larger quantity of information from the chrominance channels Cr and Cb, to which the human eye is less sensitive.

Block 6 divides each plane (channel) of the image into sub-blocks sized 8×8 pixel. Each sub-block is then transformed into an 8×8 matrix of DCT coefficients $F_{i,j}$, where i=0 . . . 7 and j=0 . . . 7. The first DCT coefficient $F_{0,0}$ is called the DC component and represents the mean value (in the sub-block) of the component associated with the plane under consideration. The other coefficients, the so-called AC components, are associated with gradually increasing spatial frequencies.

The transformation method employed is well known to persons skilled in the art and is not therefore explained in detail. It would also be possible, for example, to divide the image into sub-blocks of size M×N, where M an N can be any desired integers, or to transform the sub-blocks into any two-dimensional spatial frequency domain. If so desired, it would also be possible to sub-sample the chrominance planes in accordance with the known technique thus further reducing the information contained in these channels.

Once the DCT coefficients have been obtained, a start can be made with the quantization process, which is substantially performed in accordance with the known technique, but utilizes matrices, and even standard-type matrices, that have been further refined by means of a method in accordance with an embodiment of the present invention.

By way of example, we shall here describe the synthesis of a quantization matrix $Q^{opt}$ for the luminance channel Y, using as starting point an arbitrary quantization matrix $Q^{st}$ that could also be a standard-type matrix. An analogous procedure is adopted for the other channels, but it is also possible to utilize the quantization matrices that have not been optimized by means of a method in accordance with an embodiment of the invention.

Figure 2:
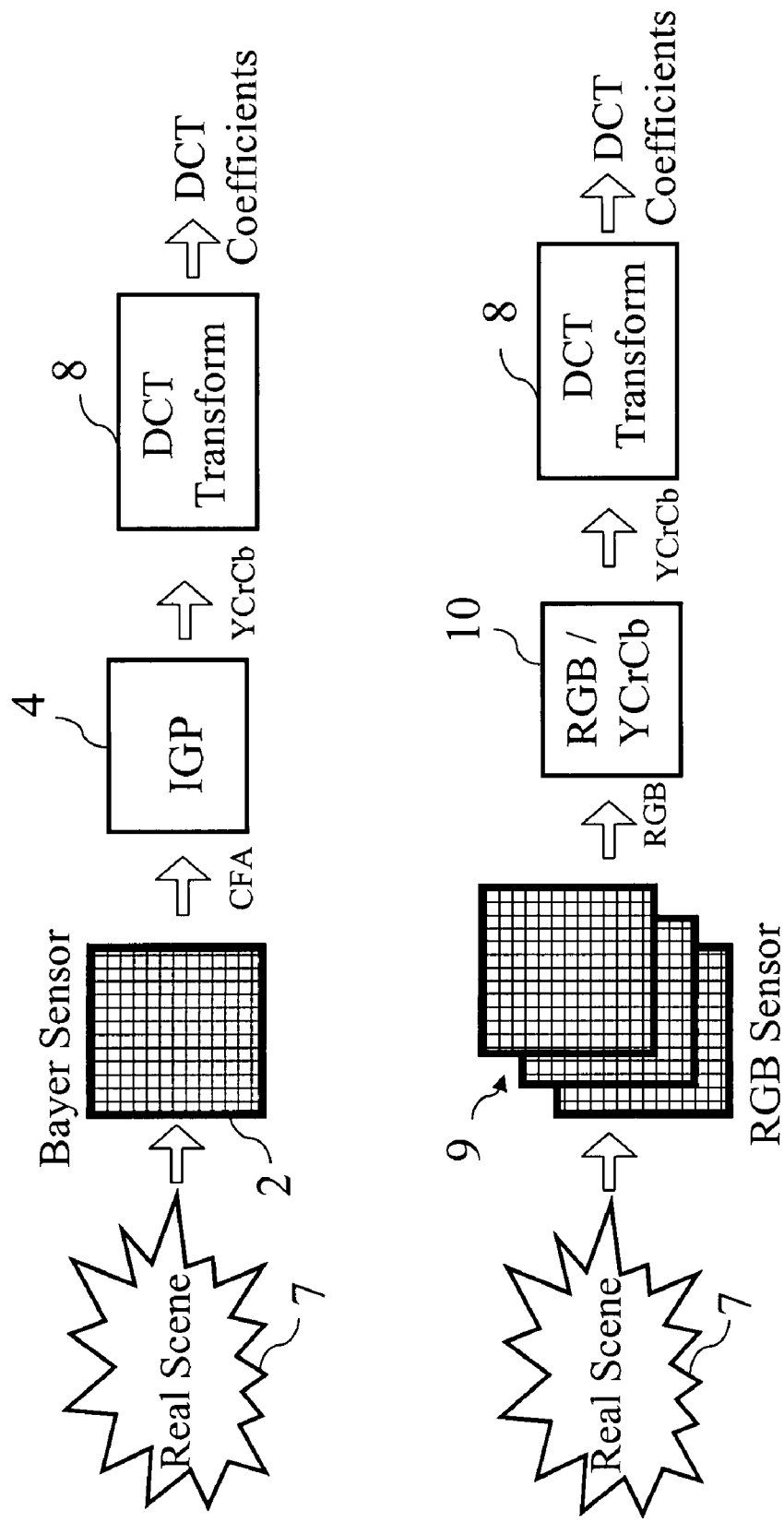
FIG. 2 shows the logic scheme of measuring the error introduced into the DCT coefficients by the processing method used in a common IGP in accordance with an embodiment of the invention.

The starting matrix $Q^{st}$ is optimized by measuring and statistically characterizing the error that the IGP block introduces into the DCT coefficients. A scheme of the method used to obtain a measure of this error is shown in FIG. 2.

On the upper line an incomplete CFA-format image representing a real scene 7 is acquired by means of a common CCD sensor 2, realized, for example as a Bayer filter, and is then processed (interpolated) by the IGP block 4 and converted into a complete YCrCb-format image. The plane Y is divided into 8×8 sub-blocks and each of these is then transformed into an 8×8 DCT coefficient matrix.

On the lower line an image representing the same real scene 7 is acquired directly in RGB format, i.e. with three components for each pixel, and with full resolution by means of a sensor 9 and then transformed into a YCrCb-format image by the block 10. The plane Y is divided into 8×8 sub-blocks and each of these is then transformed into an 8×8 DCT coefficient matrix.

The sensor 9 is capable of directly acquiring a complete image and could be, for example, a trilinear sensor or a more complex system consisting of a series of prisms that first decompose the ray of light that enters the objective into its three chromatic components and then direct these components onto three separate common CCD sensors.

When a sensor of this type—in any case a very costly item of equipment—is not available, the same measurement can be easily obtained with the help of simulation software, using as a full-resolution image an image consisting of three digital values per pixel and subsequently obtaining therefrom the corresponding incomplete CFA image by discarding two values per pixel in accordance with the pattern in which the filtering elements are arranged in the Bayer matrix (FIG. 1b).

The difference between the DCT coefficients of a sub-block of the image acquired in CFA format and the corresponding sub-block of the image acquired with full resolution is an 8×8 matrix that constitutes the representation in the DCT spatial frequency domain of the error introduced by the IGP into the sub-block.

When this measurement is repeated for a large number of images, one obtains a statistical characterization of the error introduced by the IGP (in this case concerning the plane Y) in the spatial frequency domain that does not depend on the position of the sub-block within the plane.

It has been noted that this error is a random process that, depending on the characteristics of the IGP, acts selectively in the spatial frequency domain, distorting some frequencies to a greater extent than others. For example, it has been noted that a characteristic common to many IGPs is the fact that they introduce a very great error into the DCT coefficients associated with high spatial frequencies.

A possible statistical measure of the error introduced by the IGP and associated with a DCT spatial frequency identified by the indices (i,j) is the mean $M_{i,j}$ of the modules of the errors measured at the frequency (i,j), that is to say, of the errors measured on the DCT coefficients of index (i,j) as calculated from a large number of images. The quantity $$E_{i,j} = \frac{M_{i,j}}{\sum_{i,j} M_{i,j}} \quad i = 0, \ldots, 7 \; j = 0, \ldots, 7$$

represents for every index (i,j) the error rate of the spatial frequency identified by the indices (i,j) with respect to the overall error introduced by the IGP in the spatial frequency domain.

Once this quantity is known, it is possible to obtain for each DCT frequency identified by the indices (i,j) a correction factor (or weighting coefficient) $w_{i,j}$ that is given by:

$$w_{i,j} = -\frac{S}{\log_2 E_{i,j}}$$

so that greater weights will be associated with the spatial frequencies affected by more substantial errors. S is a normalization constant and represents a gain factor, and its value is determined experimentally in such a manner as to optimize the PSNR of the compressed image.

Each element $Q_{i,j}^{opt}$ of the new quantization matrix $Q^{opt}$ can be obtained from the elements $Q_{i,j}^{st}$ of the standard matrix by multiplying these elements by the corresponding weights, i.e.:

$$Q_{i,j}^{opt} = w_{i,j} Q_{i,j}^{st}.$$

The elements of the initial quantization matrix are thus modified in such a way as to increase the value of the elements that correspond to the spatial frequencies affected by the greatest errors. This enhances the compression efficiency and at the same time eliminates image information corrupted by noise (errors).

Many variants can be applied to this basic approach. For example, experimental measurements have shown that the best results are obtained by forcing to unity the coefficients $Q_{0,0}^{st}$, $Q_{0,1}^{st}$, $Q_{1,0}^{st}$, $Q_{1,1}^{st}$ corresponding to the lowest DCT frequencies. When this is done, one avoids the possibility of having lack of uniformity between the tonalities of adjacent sub-blocks in the decoded and decompressed image (blocking effect).

In order to avoid producing artifacts, moreover, the weights $w_{i,j}$ may be applied only to those frequencies for which the measured statistical error lay below a certain threshold (for example, half the statistical error measured on the DC component). Alternatively, the weights $w_{i,j}$ may be applied only to those frequencies for which the measured statistical error lay above a certain threshold.

Experiments bring out a significant increase of the compression ratio as compared with the performance obtained with standard matrices when the quality of the decoded/decompressed image is kept constant.

Figure 3A:
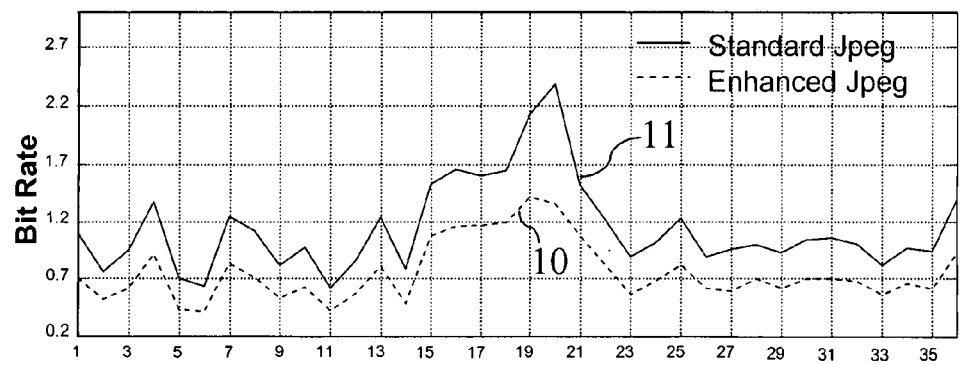
FIG. 3a shows experimental results that illustrate the performance improvement in terms of bit rate obtained by the method in accordance with an embodiment of the invention as compared with the prior art.
Figure 3B:
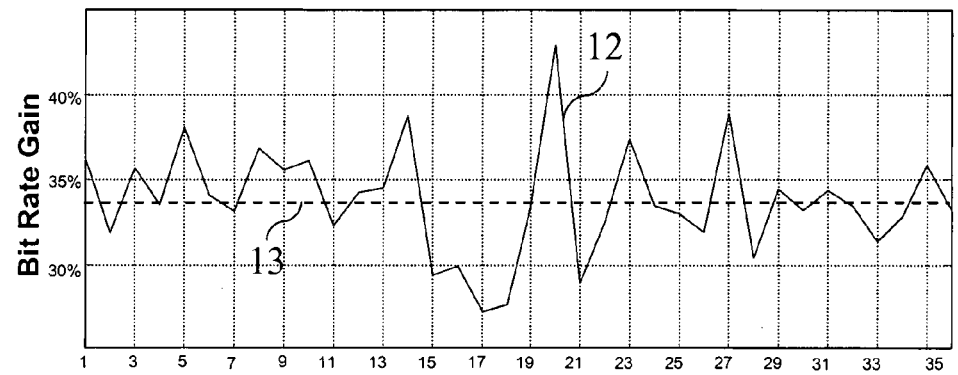
FIG. 3b shows experimental results that illustrate the performance improvement in terms of percentage and average bit rate gain obtained by the method in accordance with an embodiment of the invention as compared with prior art.

The graphs reproduced in FIGS. 3a and 3b illustrate the performance increment in terms of bit rate. In particular, the graph of FIG. 3a illustrates the bit rates (in abscissa) obtained with optimized matrices (Curve 10) and standard matrices (Curve 11) in the case of 36 images subjected to JPEG standard compression/encoding.

The percentage gain in terms of bit rate is illustrated by Curve 12 in FIG. 3b, where Curve 13 represents the average gain (35%).

Figure 4:
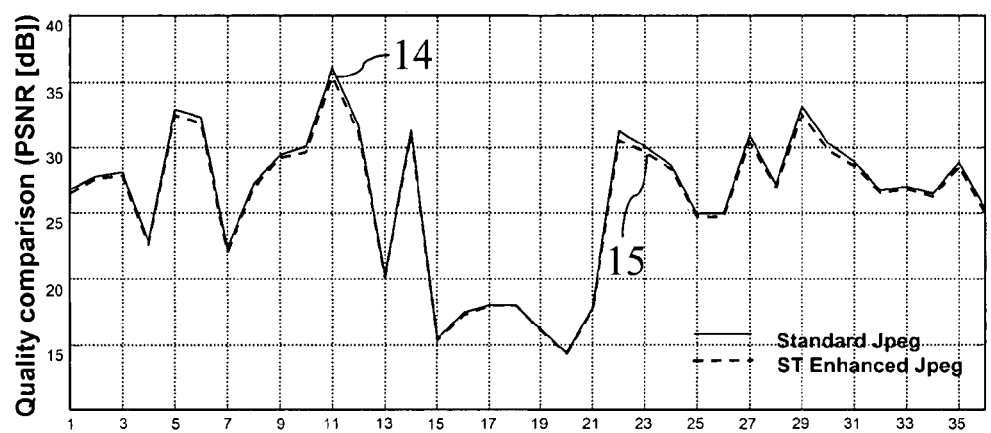
FIG. 4 shows experimental results that illustrate the comparison of perceptive quality in terms of PSNR between the method according to an embodiment of the invention and the prior art.

FIG. 4 shows a quality comparison in terms of PSNR between the method with standard matrices (Curve 14) and the method with optimized standard matrices (Curve 15).

The experimental results thus confirm that the method explained above, though employing only a single quantization matrix per plane, offers concrete advantages.

In this connection attention should also be drawn to the simplicity of this method as compared with others that, performing the optimization block by block, produce a different quantization matrix for each block and therefore do not comply with the JPEG baseline standard (which envisages the use of only one matrix per plane).

What is claimed is:

1. A camera, comprising:
    a sensor operable to acquire pixels of an image in a single image plane; and
    a processor coupled to the sensor and operable to,
    interpolate the single plane of pixels into multiple planes of pixels,
    transform the pixels of the multiple planes into transform coefficients, and
    quantize one of the transform coefficients with a quantization value that has been weighted according to an error that the processor introduced to the one transform coefficient as a result of the interpolation of the single plane of pixels.

2. The camera of claim 1 wherein the sensor comprises a charge-coupled-device sensor.

3. The camera of claim 1 wherein the sensor comprises a CMOS sensor.

4. The camera of claim 1 wherein the processor is operable to transform the pixels into Discrete Cosine Transform coefficients.

5. The camera of claim 1 wherein the processor is operable to transform the pixels into Discrete Wavelet Transform coefficients.

6. The camera of claim 1 wherein the processor is operable to generate the weighted quantization value by multiplying a standard quantization value with a weighting factor that is proportional to the error that the processor introduced to the one transform coefficient.

7. The camera of claim 1 wherein the processor is operable to quantize the one transform coefficient with a quantization value that has been weighted according to an error that the processor statistically introduced to the one transform coefficient.

8. A method, comprising:
    acquiring a single plane of an image;
    interpolating the single plane into pixels, which represent multiple planes of the image;
    introducing an error to at least one of the pixels as a result of the interpolating;
    transforming the pixels of the image into transform coefficients; and
    quantizing the transform coefficients with respective quantization values, the quantization value corresponding to the at least one pixel having been weighted according to the error.

9. The method of claim 8 wherein introducing an error to at least one of the pixels as a result of the interpolating comprises introducing a statistical error to the at least one of the pixels as a result of the interpolating.

* * * * *